(12) United States Patent
Shibuno

(10) Patent No.: US 8,982,246 B2
(45) Date of Patent: Mar. 17, 2015

(54) IMAGING APPARATUS AND CAMERA BODY HAVING OPTICAL ZOOM FUNCTION AND DIGITAL ZOOM FUNCTION

(75) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 513 days.

(21) Appl. No.: 13/277,598

(22) Filed: Oct. 20, 2011

(65) Prior Publication Data

US 2012/0099004 A1  Apr. 26, 2012

(30) Foreign Application Priority Data

Oct. 22, 2010  (JP) .................................. 2010-236998

(51) Int. Cl.
*H04N 5/262* (2006.01)
*H04N 5/232* (2006.01)
*H04N 5/228* (2006.01)

(52) U.S. Cl.
CPC ................................ *H04N 5/23296* (2013.01)
USPC ....................................... 348/240.1; 348/347

(58) Field of Classification Search
USPC ............................................ 348/240.1–240.3
See application file for complete search history.

(56) References Cited

U.S. PATENT DOCUMENTS

| | | | | |
|---|---|---|---|---|
| 8,077,225 B2 * | 12/2011 | Nakayama | ................. | 348/240.1 |
| 2002/0101531 A1 * | 8/2002 | Kaneda | ......................... | 348/347 |
| 2003/0011692 A1 * | 1/2003 | Shore et al. | ................ | 348/240.3 |
| 2006/0262974 A1 | 11/2006 | Watanabe et al. | | |
| 2007/0053068 A1 | 3/2007 | Yamamoto et al. | | |

FOREIGN PATENT DOCUMENTS

| | | |
|---|---|---|
| JP | 2000-184259 | 6/2000 |
| JP | 2000-231149 | 8/2000 |
| JP | 2006-129193 | 5/2006 |
| JP | 2006-325276 | 11/2006 |
| JP | 2007-028283 | 2/2007 |
| JP | 2008-301172 | 12/2008 |

* cited by examiner

*Primary Examiner* — Twyler Haskins
*Assistant Examiner* — Carramah J Quiett
(74) *Attorney, Agent, or Firm* — Panasonic Patent Center

(57) ABSTRACT

An imaging apparatus includes an obtaining unit that obtains lens information including information indicating resolution of an optical system with respect to a position of a zoom lens, an imaging sensor that captures a subject image formed through the optical system to output image information, an image processor that performs digital zoom to electronically enlarge a subject image by performing image processing on the image information outputted from an imaging sensor, and a controller that determines, based on the obtained lens information, whether the zoom lens is located in a predetermined position and controls the image processor to perform the digital zoom on the image information outputted from the imaging sensor, when the zoom lens is located in the predetermined position. The predetermined position is a position of the zoom lens where resolution of the optical system is larger than a predetermined value.

13 Claims, 13 Drawing Sheets

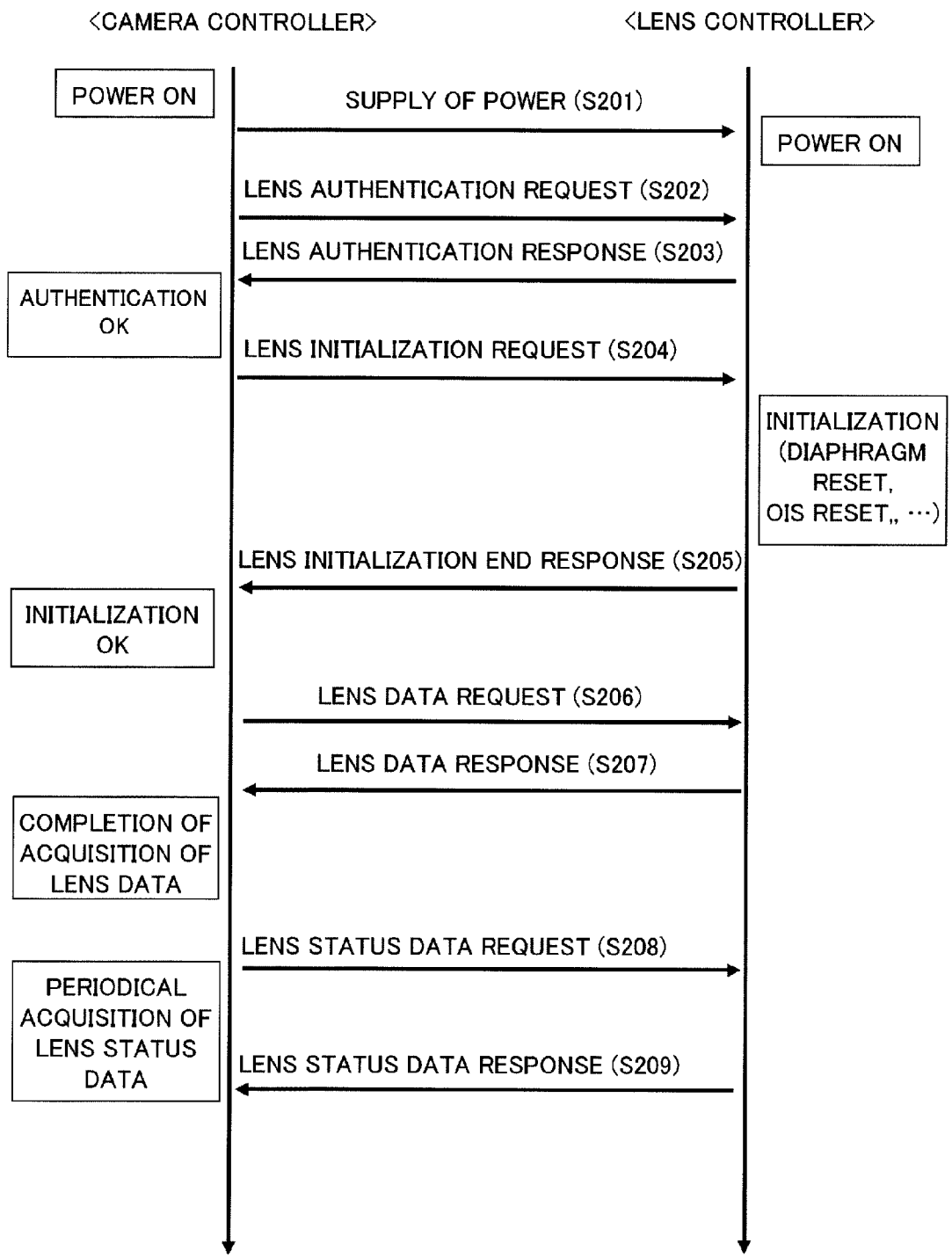

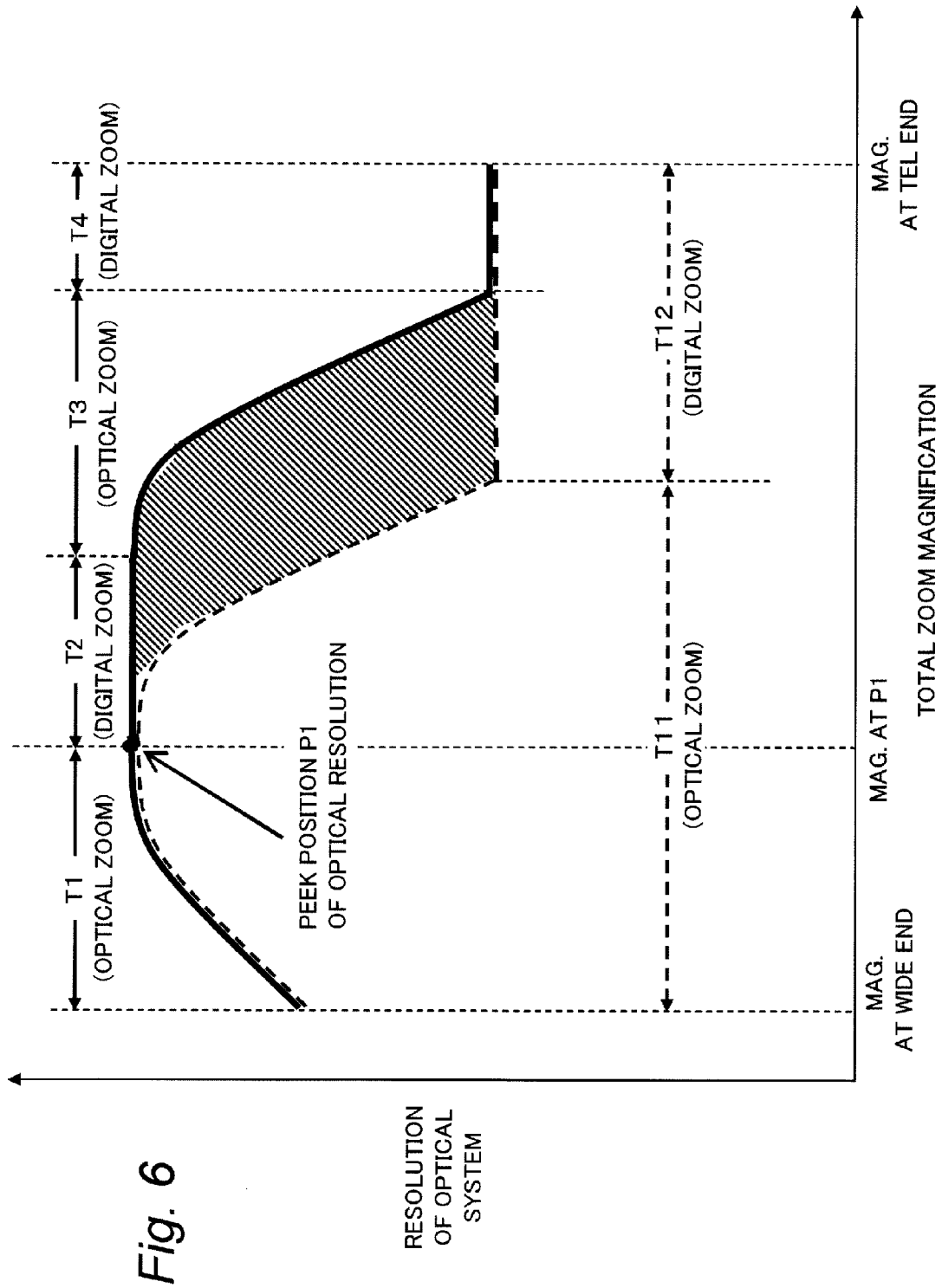

IMAGING APPARATUS AND CAMERA BODY HAVING OPTICAL ZOOM FUNCTION AND DIGITAL ZOOM FUNCTION

BACKGROUND

1. Technical Field

The technical field relates to an imaging apparatus having a zoom function, and more particularly to an imaging apparatus having an optical zoom function and a digital zoom function.

2. Related Art

In recent years, a digital camera has proliferated which has an optical zoom function that optically changes the size of a subject image formed on an imaging device by changing the lens position of an optical system, and a digital zoom function scaling up/down an output image by performing digital processing on an output signal from the imaging device.

For example, a digital camera described in JP-2000-231149-A performs control so that an optical zoom function is used in a wide-angle side range of a zoom lens and the zoom function is switched to a digital zoom function when the zoom lens reaches a tele end side. By thus performing the optical zoom and the digital zoom in combination, a zoom function with higher magnification is achieved.

In the case of the optical zoom, the resolution of an image formed changes with the magnification of the optical zoom, i.e., the position of a zoom lens. Thus, in some magnifications of the optical zoom, the resolution of an image formed by the zoom lens may decrease and accordingly high resolution may not be obtained when the optical zoom and the digital zoom are combined. That is, by combining the optical zoom and the digital zoom, an image with higher magnification can be recorded but high resolution of the image obtained is not guaranteed.

In view of the above-described problem, an imaging apparatus is provided that is capable of capturing an image with better resolution in shooting a picture using the optical zoom and the digital zoom.

SUMMARY

An imaging apparatus includes an optical system including a zoom lens, a zoom lens driver that performs optical zoom by driving the zoom lens according to user's manipulation, an obtaining unit that obtains lens information including information indicating resolutions of the optical system for positions of the zoom lens, an imaging sensor that captures a subject image formed through the optical system to output image information, an image processor that performs digital zoom to electronically enlarge the subject image by performing image processing on the image information outputted from the imaging sensor, and a controller that determines, based on the obtained lens information, whether the zoom lens is located in a predetermined position and controls the image processor to perform the digital zoom on the image information outputted from the imaging sensor, when the zoom lens is located in the predetermined position. The predetermined position is a position of the zoom lens where resolution of the optical system is larger than a predetermined value.

According to the above configuration, the range for performing digital zoom is defined such that the digital zoom is performed in a range of zoom lens positions (optical zoom magnification) which provides an excellent optical characteristic (e.g., the resolution of an optical system). By this, the imaging apparatus can be achieved, which is capable of capturing an image with excellent resolution in a wider zoom range.

BRIEF DESCRIPTION OF DRAWINGS

FIG. 3 is a flowchart of an initial setting operation of the digital camera;

FIG. 6 is a diagram for describing a technical effect obtained by the zoom control operation according to the first embodiment;

DETAILED DESCRIPTION OF PREFERRED EMBODIMENTS

Preferred embodiments will be described below in detail using the drawings.

First Embodiment

1. Configuration

A configuration of a digital camera of the embodiment will be described below using the drawings.

1-1. Overview

Figure 1:
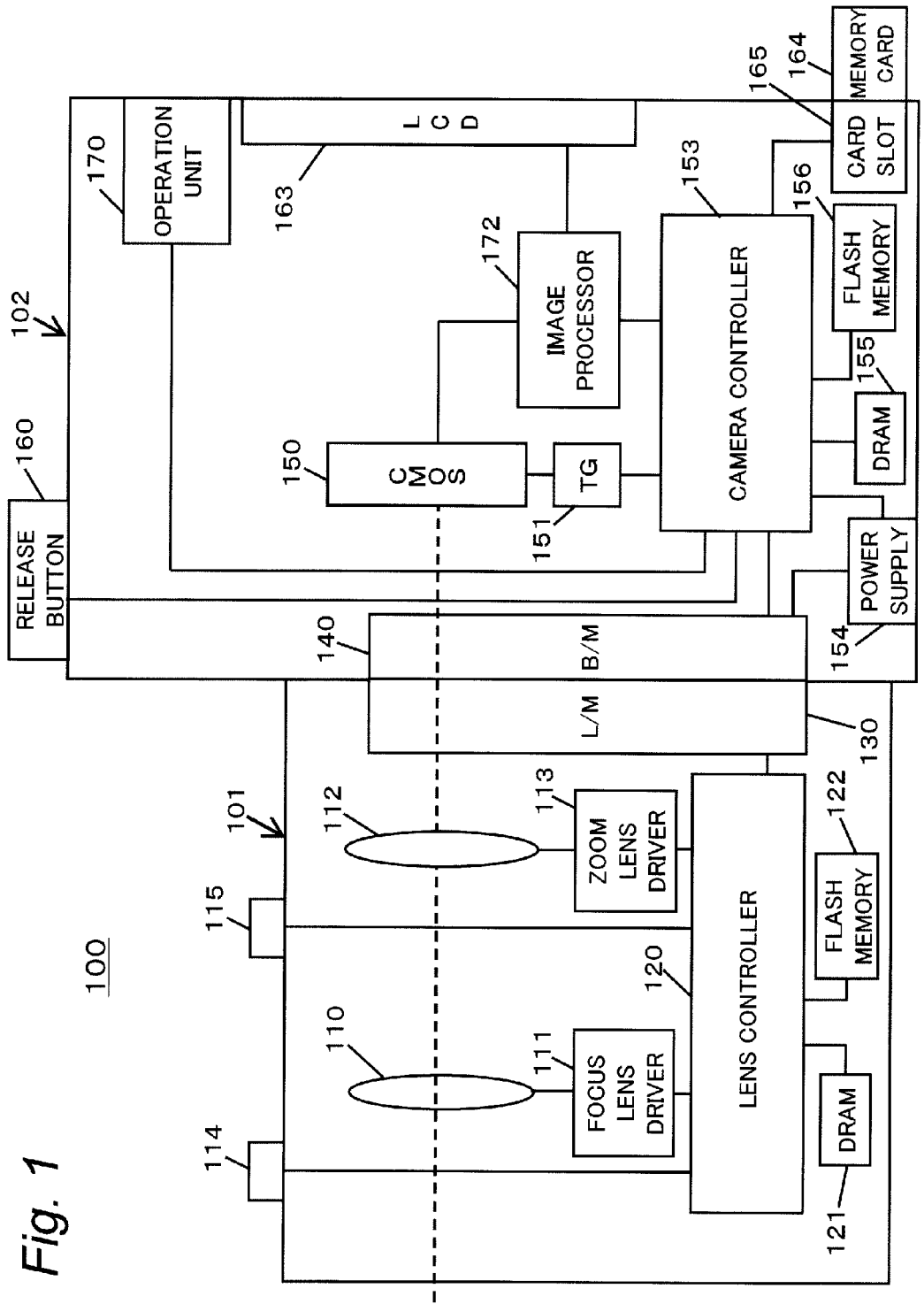
FIG. 1 is a configuration diagram of a digital camera according to a first embodiment.

FIG. 1 is a block diagram showing a configuration of a digital camera 100 according to a first embodiment. The digital camera 100 includes a camera body 102 and an interchangeable lens 101 mountable to the camera body 102. The interchangeable lens 101 has a zoom lens 112 which is driven by a zoom lens driver 113. The camera body 102 can electrically drive the zoom lens 112 through a lens controller 120. Namely, the interchangeable lens 101 is a motor-driven zoom lens.

1-2. Configuration of Camera Body

The camera body 102 includes a CMOS image sensor 150, a liquid crystal display (LCD) monitor 163, an image processor 172, a timing generator (B) 151, a camera controller 153, a body mount 140, a release button 160, an operation unit 170, a power supply 154, a DRAM 155, a flash memory 156, and a card slot 165.

The camera controller 153 controls the overall operation of the digital camera 100 by controlling the components such as the CMOS image sensor 150, according to instructions from an operating member such as the release button 160 and the operation unit 170. The camera controller 153 sends a vertical synchronizing signal to the timing generator 151. In parallel with this, the camera controller 153 generates an exposure synchronizing signal, based on the vertical synchronizing signal. The camera controller 153 periodically and repeatedly sends the generated exposure synchronizing signal to the lens controller 120 through the body mount 140 and a lens mount 130. This enables the camera controller 153 to control lenses such as, for example, a focus lens 110 in the interchangeable lens 101 so as to be synchronized with an exposure timing. The camera controller 153 uses the DRAM 155 as a working memory when performing a control operation and an image processing operation. The camera controller 153 may be composed of a hard-wired electronic circuit or may include a microcomputer using a program, and so on. Alternatively, the camera controller 153 may be formed in one semiconductor chip on which the image processor 172 and the DRAM 155 are formed, or may be formed in another semiconductor chip.

The CMOS image sensor 150 is configured to include a light-receiving element, an AGC (Gain Control Amplifier), and an AD converter. The light-receiving element converts an optical signal collected by the interchangeable lens 101 into an electrical signal thereby generating image information. The AGC amplifies the electrical signal outputted from the light-receiving element. The AD converter converts the electrical signal outputted from the AGC into a digital signal. The CMOS image sensor 150 operates at a timing which is controlled by the timing generator 151. The operations of the CMOS image sensor 150 controlled by the timing generator 151 include a still image capturing operation, a through image capturing operation, a data transfer operation, an electronic shutter operation, and so on. The through image is mainly a moving image and is displayed on the LCD monitor 163 in order for a user to determine a composition for capturing a still image. The image information generated by the CMOS image sensor 150 is supplied to the image processor 172. Note that instead of the CMOS image sensor 150, other imaging devices such as an NMOS image sensor and a CCD image sensor may be used.

The image processor 172 performs predetermined image processing on image data which is converted into a digital signal with the AD converter in the CMOS image sensor 150. The predetermined image processing may include, for example, a gamma correction process, a white balance correction process, a flaw correction process, a YC conversion process, a digital zoom process, a compression process, a decompression process, and so on, but are not limited thereto.

The LCD monitor 163 is a display unit disposed at the rear of the camera body 102. The LCD monitor 163 displays thereon an image represented by display image information processed by the image processor 172. The LCD monitor 163 can selectively display thereon both a moving image and a still image. In addition to the images, the LCD monitor 163 can display thereon information such as setting conditions of the digital camera 100. Although, in the present embodiment, the LCD monitor 163 is shown as an example of the display unit, the display unit is not limited thereto. For example, an organic EL display may be used as a display unit.

The flash memory 156 functions as an internal memory for storing image information, and so on. In addition, the flash memory 156 stores a program and parameters used when the camera controller 153 performs control.

The card slot 165 is a connector that allows a memory card 164 to be inserted into the camera body 102. The card slot 165 can connect the memory card 164 electrically and mechanically thereto. The card slot 165 may have the function of controlling the memory card 164.

The memory card 164 is an external memory including therein a storage device such as a flash memory. The memory card 164 can store data such as image information processed by the camera controller 153. In addition, the memory card 164 can output data such as image information stored therein. Image data read from the memory card 164 is processed by the camera controller 153 and the image processor 172 and then is displayed on, for example, the LCD monitor 163. Although in the present embodiment the memory card 164 is shown as an example of the external memory, the external memory is not limited thereto. For example, a recording medium such as an optical disc can also be used as an external memory.

The body mount 140 is mechanically and electrically connectable to the lens mount 130 (described later) of the interchangeable lens 101. The body mount 140 can perform sending and receiving of data between the camera body 102 and the interchangeable lens 101 through the lens mount 130. The body mount 140 sends an exposure synchronizing signal and other control signals which are received from the camera controller 153, to the lens controller 120 through the lens mount 130. In addition, the body mount 140 sends a signal received from the lens controller 120 through the lens mount 130, to the camera controller 153.

The power supply 154 supplies power for driving the digital camera 100. The power supply 154 may be, for example, a dry battery or a rechargeable battery. Alternatively, the power supply 154 may supply power provided from an external source through a power cord, to the digital camera 100. When the power supply 154 is turned on, the camera controller 153 supplies power to each component in the camera body 102. The camera controller 153 also supplies power to the interchangeable lens 101 through the body mount 140 and the lens mount 130. Then, in the interchangeable lens 101, the power is supplied to each component in the interchangeable lens 101 by the lens controller 120 (described later).

The release button 160 accepts a user's operation performed to provide an imaging instruction or an autofocus instruction. The release button 160 can be operated at two steps: a half press and a full press. By a half-press operation of the release button 160 by the user, the camera controller 153 performs an autofocus operation. By a full-press operation of the release button 160 by the user, the camera controller 153 records image data generated according to the timing of the full-press operation, in the memory card 164.

The operation unit 170 includes a cross button capable of providing manipulation (operation) instructions in up, down, left, and right directions. When the interchangeable lens 101 having a motor-driven zoom function is attached to the camera body 102, the camera controller 153 assigns the functions of serving as zoom manipulation buttons to the left and right buttons of the operation unit 170, respectively. For example, the camera controller 153 assigns the function of serving as a zoom manipulation button in a wide end side direction to the left button and assigns the function of serving as a zoom manipulation button in a tele end side direction to the right button. Note that, when the interchangeable lens 101 having a motor-driven zoom function which is to be attached to the camera body 102 has a zoom lever used by the user to perform zoom manipulation, it is not necessarily required to assign the functions of serving as zoom manipulation buttons to the operation unit 170.

1-3. Configuration of Interchangeable Lens

The interchangeable lens 101 includes the focus lens 110, a focus lens driver 111, a focus ring 114, the zoom lens 112, the zoom lens driver 113, a zoom lever 115, the lens controller 120, a DRAM 121, a flash memory 122, and the lens mount 130. The interchangeable lens 101 may further include a camera shake correction lens in addition to the lenses shown in FIG. 1.

The lens controller 120 controls the overall operation of the interchangeable lens 101. The lens controller 120 may include a hard-wired electronic circuit or may include a microcomputer using a program, etc.

The DRAM 121 functions as a working memory used when the lens controller 120 performs control. The flash memory 122 saves a program, parameters, and lens data which are used when the lens controller 120 performs control. Here, the lens data includes characteristic values specific to the interchangeable lens 101, such as lens name, F-number, focal length, whether it has a motor-driven zoom function, and resolution characteristic information (a detail of which will be described later). As will be described later, the lens controller 120 notifies the camera controller 153 of lens data, and the camera controller 153 can perform various control operations according to the lens data.

The zoom lens 112 is a lens for changing the magnification of a subject image formed by an optical system of the interchangeable lens 101. The lenses included in the zoom lens 112 may be any in number and of any group.

In the present embodiment, the interchangeable lens 101 has a motor-driven zoom function. The zoom lever 115 is an operating lever which is operated when the user drives motor-driven zoom, and is provided on the exterior of the interchangeable lens 101. The zoom lens 112 can be moved to the wide end side and the tele end side, according to the operation direction of the zoom lever 115. Namely, the user can instruct the lens controller 120 about a moving direction of the zoom lens 112 by an operation direction of the zoom lever 115. In addition, the user can adjust the speed at which the zoom lens 112 moves, by the position (amount) in which the zoom lever 115 is operated. For example, the user can instruct the zoom lens 112 to slowly move in a specified direction (a direction according to an operation direction), by operating the zoom lever 115 by a small amount. In addition, the user can instruct the zoom lens 112 to quickly move in a specified direction, by operating the zoom lever 115 by a large amount. That is, the zoom lever 115 sends the lens controller 120 information on the direction and speed of an operation performed by the user (corresponding to the moving direction and movement speed of the zoom lens 112). The lens controller 120 controls the zoom lens driver 113 to move the zoom lens 112, according to the information on the moving direction and movement speed of the zoom lens 112 instructed by the user through the zoom lever 115.

The zoom lens driver 113 moves the zoom lens 112 along an optical axis of the optical system, based on control by the lens controller 120. The zoom lens driver 113 is implemented by a stepping motor, a DC motor, an ultrasonic motor, etc.

The focus lens 110 is a lens for changing the focus state of a subject image which is incident from the optical system and formed on the CMOS image sensor 150. The lenses included in the focus lens 110 may be any in number and of any group.

The focus ring 114 is provided on the exterior of the interchangeable lens 101. When the focus ring 114 is operated by the user, information about the amount of operation of the focus ring 114 is notified to the lens controller 120. The lens controller 120 allows the focus lens driver 111 to drive the focus lens 110, based on the notified information about the amount of operation of the focus ring 114.

The focus lens driver 111 drives the focus lens 110 to move back and forth along the optical axis of the optical system, based on control by the lens controller 120. The focus lens driver 111 can be implemented by, for example, a stepping motor, a DC motor, an ultrasonic motor, etc.

1-4. Correspondence of Terms

The zoom lens 112 is an example of a zoom lens. The zoom lens driver 113 is an example of a zoom lens driver. The camera controller 153 is an example of an obtaining unit. The CMOS image sensor 150 is an example of an imaging sensor. The image processor 172 is an example of an image processor. A configuration including the lens controller 120 and the camera controller 153 is an example of a controller. A configuration including the camera controller 153 and the card slot 165 is an example of a recording controller. The digital camera 100 is an example of an imaging apparatus. The interchangeable lens 101 is an example of an interchangeable lens. The camera body 102 is an example of a camera body.

2. Operation

The operation of the digital camera 100 will be described below using the drawings.

2-1. Digital Zoom

The digital camera 100 of the present embodiment has optical zoom and digital zoom as zoom functions to enlarge a subject image included in an image. The optical zoom is implemented by moving the zoom lens 112 in an optical axis direction. The digital zoom is electronically implemented by performing, by the image processor 172, image processing on image data generated by the CMOS image sensor 150. Control of the digital zoom will be described below.

The digital zoom is a process to perform a process of cutting out an image in a partial region from the entire image created by the CMOS image sensor 150 and furthermore perform a number-of-pixels conversion process (a process for converting number-of-pixels of an image) on the cut out image, thus enlarging or reducing the size of a subject included in an image represented by image data. A digital zoom process is controlled by the image processor 172. In the digital zoom process, the image processor 172 cuts out a part of image information obtained from the CMOS image sensor 150 (a cutout process) and performs a number-of-pixels conversion process on the cut out image, thereby electronically enlarging or reducing a subject image. The number-of-pixels converting process includes processes such as pixel mixing, pixel interpolation, and pixel thinning-out.

The control of the digital zoom will be more specifically described with reference to FIGS. 2A to 2D. FIGS. 2A to 2D are diagrams for describing digital zoom processes of the digital camera 100. In the following, it is assumed that the number of valid pixels of the CMOS image sensor 150 is 8 M (mega) pixels and the digital camera 100 is set to a mode in which an image with an image size of 3 M pixels is recorded in the memory card 164.

In FIGS. 2A to 2D, an image X represents an image formed on the CMOS image sensor 150. An image Y represents an image recorded in the memory card 164. A region R1, a region R2, and a region R3 indicate regions subjected to a cutout process in the image X.

Figure 2A:
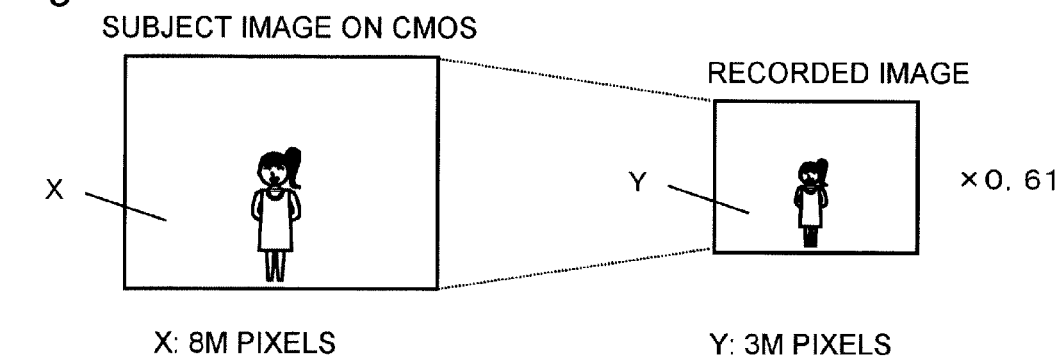
FIGS. 2A to 2D are schematic diagrams for describing digital zoom operations.

FIG. 2A is a diagram describing an example case of creating a recorded image Y with 3 M pixels from an image X with 8 M pixels, without performing a cutout process. In this case, the image processor 172 creates an image Y with 3 M pixels by performing a number-of-pixels conversion process on an image X with 8 M pixels. In the case of the example shown in FIG. 2A, the image Y is obtained by multiplying the entire image X by a factor of 0.61 (=root(3 M pixels/8 M pixels)) by the number-of-pixels conversion process (e.g., a pixel thinning-out process). Note that, in other words, the process shown in FIG. 2A can also be said to be a process of cutting out the entire region of the image X and performing a number-of-pixels conversion process on the cut out image.

Figure 2B:
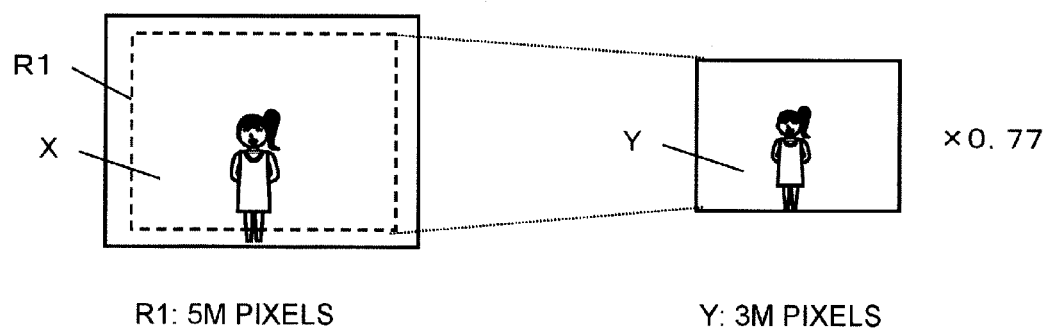

FIG. 2B is a diagram describing an example case of cutting out a partial region R1 of an image X and creating, from a cut out image, an image Y with a size smaller than that of the cut out image. In the example shown in FIG. 2B, the image processor 172 cuts out a partial region R1 (5 M pixels) of the image X. Then, the image processor 172 creates, from an image in the cut out region R1, an image Y with 3 M pixels by the number-of-pixels conversion process. Specifically, in the case of the example shown in FIG. 2B, the image Y is obtained by multiplying the region R1 which is a part of the image X by a factor of 0.77 (=root (3 M pixels/5 M pixels)) by the number-of-pixels conversion process.

Figure 2C:
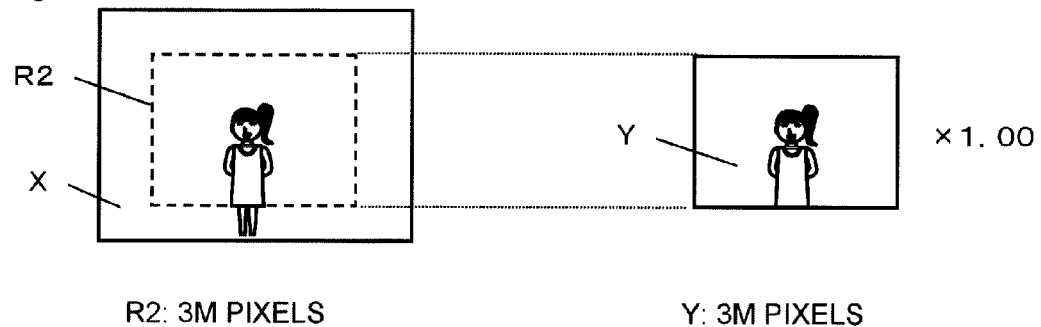

FIG. 2C is a diagram describing an example case of cutting out a partial region R2 of an image X and creating, from the cut out image, an image Y with a size equal to that of the cut out image. In the example shown in FIG. 2C, the image processor 172 cuts out a partial region R2 (3 M pixels) of the image X. Then, the image processor 172 creates an image Y with 3 M pixels from an image in the cut out region R2. Specifically, in the case of the example shown in FIG. 2C, the image processor 172 creates a 1.00× image Y for the region R2 which is a part of the image X.

In the examples shown in FIGS. 2A to 2C, since the number of pixels in a cutout region is greater than or equal to the number of pixels of a recorded image, digital zoom can be implemented without causing degradation in image quality.

Figure 2D:
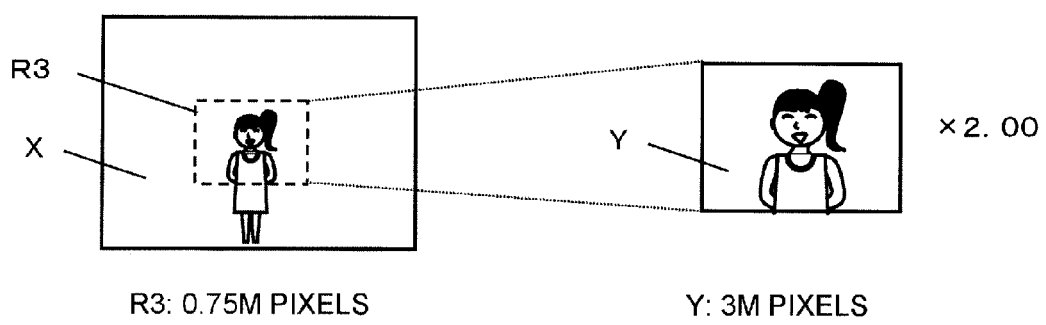

FIG. 2D is a diagram describing an example case of cutting out a partial region R3 of an image X and creating, from the cut out image, an image Y with a size larger than that of the cut out image. In the example shown in FIG. 2D, the image processor 172 cuts out a partial region R3 (750 thousand pixels) of the image X. Then, the image processor 172 creates, from an image in the cut out region R3, an image Y with 3 M pixels by a number-of-pixels conversion process. Specifically, in the case of the example shown in FIG. 2D, the image processor 172 creates the image Y by multiplying the region R3 which is a part of the image X by a factor of 2.00 (=root(3 M pixels/750 thousand pixels)) by the number-of-pixels conversion process. In this case, since the number of pixels of a recorded image is greater than the number of pixels in the cut out region R3, a subject is enlarged but the image quality degrades.

As described above, the image processor 172 implements the digital zoom by increasing or decreasing the range of a region to be cut out from an image X. Specifically, in zoom manipulation through the zoom lever 115, when zoom to the tele end side is instructed by the user, the image processor 172 performs control to reduce a cutout region to achieve electronic enlargement (zoom in), while zoom to the wide end is instructed, the image processor 172 performs control to increase a cutout region to achieve electronic reduction (zoom out).

2-2. Image Capturing Preparation Operation

An initial setting operation of the digital camera 100 for image capturing preparation will be described. An initial setting operation is performed when the power to the digital camera 100 is turned on. FIG. 3 is a diagram describing an operation sequence of an initial setting operation of the digital camera 100.

When the user turns on the power supply 154 to the camera body 102 with the interchangeable lens 101 attached to the camera body 102, the power supply 154 supplies power to the interchangeable lens 101 through the body mount 140 and the lens mount 130 (S201). This makes the interchangeable lens 101 placed in a power-on state. Then, the camera controller 153 requests the lens controller 120 for authentication information of the interchangeable lens 101 (S202). Here, the authentication information of the interchangeable lens 101 includes information about whether the interchangeable lens 101 is attached to the camera body 102 and information about whether accessories are attached to the camera body 102. The lens controller 120 responds to the lens authentication request from the camera controller 153 (S203). This enables the camera controller 153 to complete the lens authentication and determine whether the interchangeable lens 101 is attached to the camera body 102 and whether accessories such as a teleconverter lens and a wide converter lens are attached.

Then, the camera controller 153 requests the lens controller 120 to perform an initialization operation (S204). In response to this, the lens controller 120 performs an initialization operation such as resetting a diaphragm (not shown) and resetting a camera shake correction lens (not shown). Then, the lens controller 120 sends the camera controller 153 a response indicating that the lens initialization operation has been completed (S205). This enables the camera controller 153 to determine that the lens has been initialized.

Then, the camera controller 153 requests the lens controller 120 for lens data (S206). The lens data is stored in the flash memory 122. Hence, the lens controller 120 reads lens data from the flash memory 122 and sends, as a response, the lens data to the camera controller 153 (S207). Here, the lens data includes information about characteristic values specific to the interchangeable lens 101, such as lens name, F-number, focal length, information as to whether it supports a motor-driven zoom function, and resolution characteristic information.

When the camera controller 153 completes the obtaining of the lens data of the interchangeable lens 101 attached to the camera body 102, the digital camera 100 goes into a state in which the digital camera 100 can capture an image. In this state, the camera controller 153 periodically requests the lens controller 120 for lens state data representing the state of the interchangeable lens 101 (S208). The lens state data includes, for example, information about zoom magnification of the zoom lens 112, information about position of the zoom lens 112, information about position of the focus lens 110, and information about aperture value. In response to this request, the lens controller 120 sends, as a response, the requested lens state data to the camera controller 153 (S209).

In this state, the digital camera 100 can operate in a control mode in which an image represented by image data which is generated by the CMOS image sensor 150 is displayed on the LCD monitor 163 as a through image. This control mode is called a "live view mode". In the live view mode, a through image is displayed on the LCD monitor 163 as a moving image, so that the user can determine a composition for capturing a still image while viewing the LCD monitor 163.

2-3. Zoom Control Operation

Figure 4:
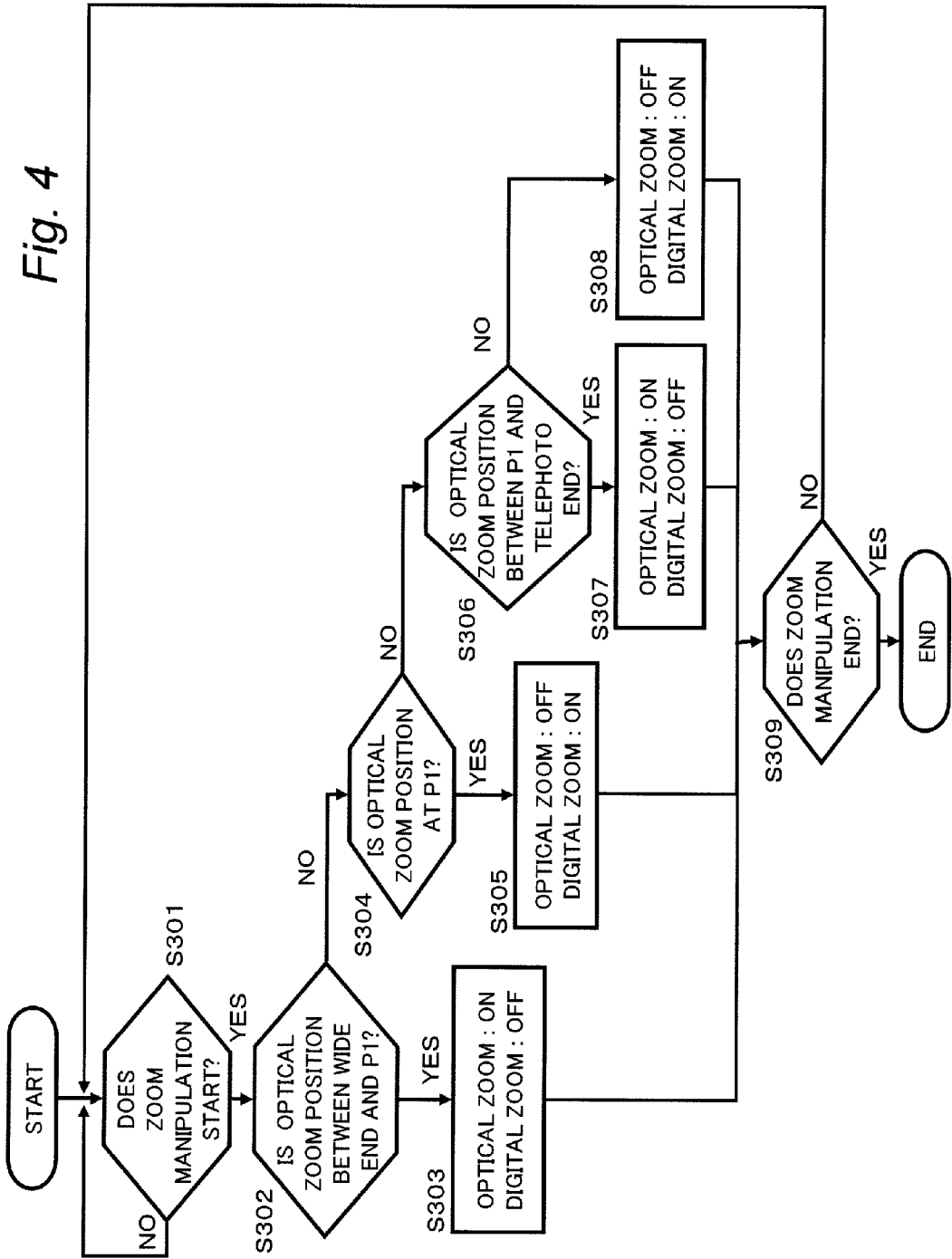
FIG. 4 is a flowchart of a zoom control operation according to the first embodiment.
Figure 5A:
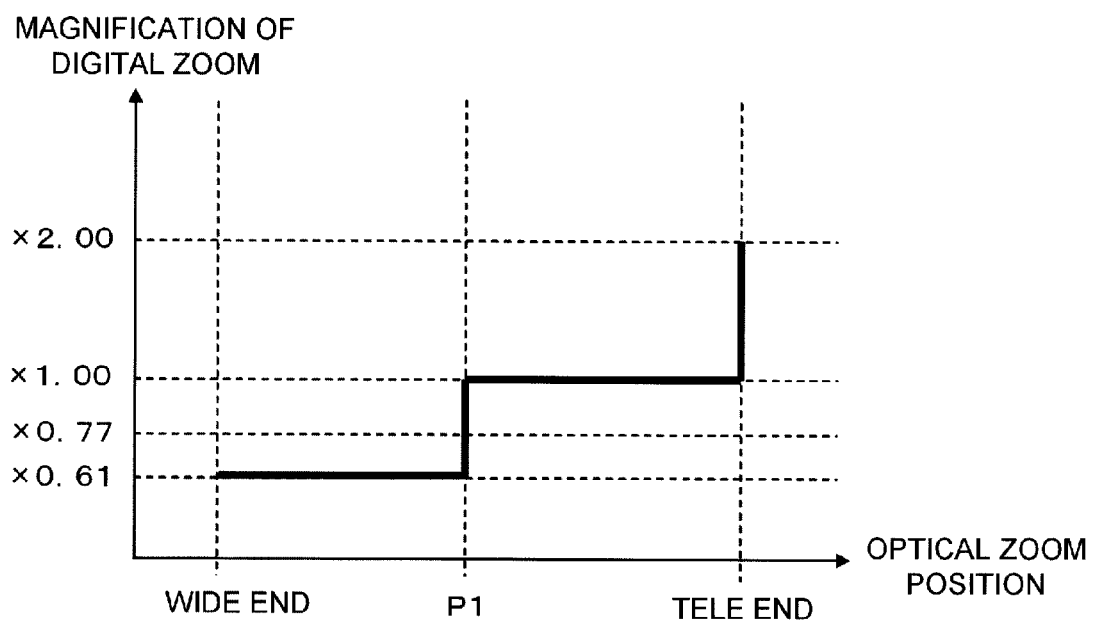
FIGS. 5A and 5B are diagrams for describing the zoom control operation according to the first embodiment.
Figure 5B:
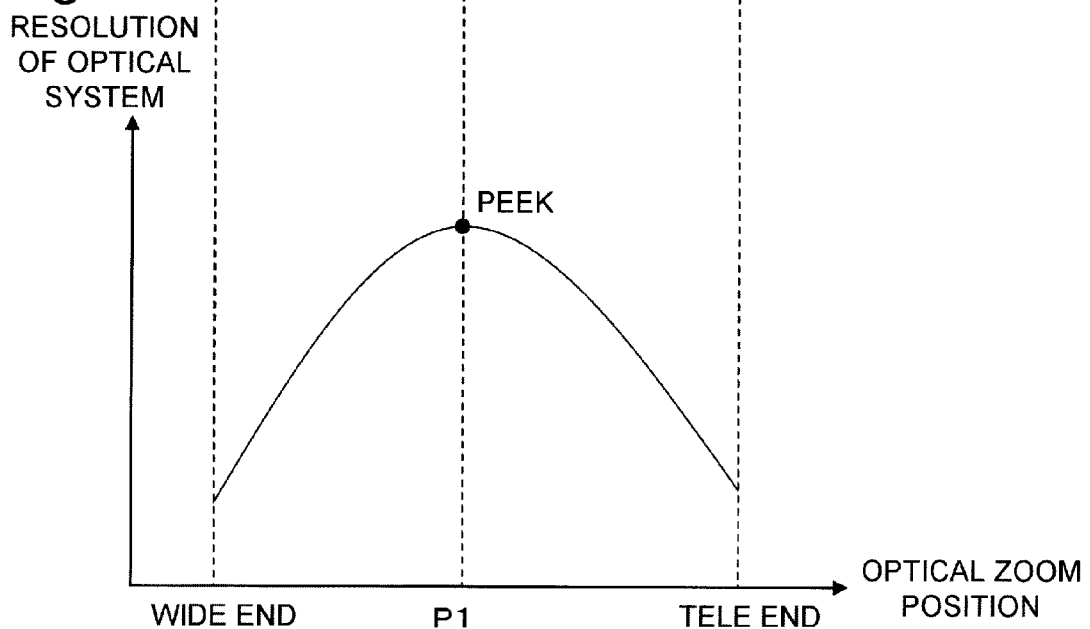

Using FIGS. 4 and 5A to 5B, a zoom control operation of the digital camera 100 according to the first embodiment will be described. FIG. 4 is a flowchart of a zoom control operation of the digital camera 100 according to the first embodiment. FIG. 5A is a diagram showing a relationship of the digital zoom magnification with respect to the optical zoom position in the zoom control operation according to the first embodiment. FIG. 5B is a diagram showing an example of the resolution characteristic of the optical system of the interchangeable lens 101 according to the first embodiment.

The optical system of the interchangeable lens 101 of the present embodiment has a resolution characteristic such as that shown in FIG. 5B. In the resolution characteristic, the resolution increases as the position of the zoom lens 112 (optical zoom position) moves from the wide end side to a position P1, the resolution takes its peak value in the position P1, and the resolution decreases as the optical zoom position moves from the position P1 to the tele end side.

In the present embodiment, in lens data, resolution characteristic information is sent to the camera body 102 from the interchangeable lens 101. The resolution characteristic information includes information about resolution values for optical zoom positions, and information about resolution values for zoom magnifications or focal lengths. By referring to the lens data, the camera controller 153 can determine a resolution of the optical system in an optical zoom position (zoom lens position), based on optical zoom position information (the position information of the zoom lens 112), zoom magnification, or focal length information which are obtained from the lens controller 120.

In the following description, the case will be described in which the resolution characteristic information is information indicating resolution values for various optical zoom positions (the positions of the zoom lens 112) and the camera controller 153 obtains such resolution characteristic information from the lens controller 120 and controls a zoom operation based on the obtained information. Note that the same operation is also performed when the resolution characteristic information is information about resolution values for zoom magnification or focal length information.

With reference to the flowchart shown in FIG. 4, a zoom control operation performed when the interchangeable lens (motor-driven zoom lens) 101 having a resolution characteristic such as that shown in FIG. 5B is attached to the camera body 102 will be described.

The camera controller 153 monitors whether zoom manipulation has been started by the user (S301). The camera controller 153 repeats this step until detecting the start of zoom manipulation by the user. Zoom manipulation by the user includes an operation performed using the operation unit 170 included in the camera body 102 and an operation performed using the zoom lever 115 included in the interchangeable lens 101.

When the operation unit 170 is operated (manipulated) with the left and right buttons of the operation unit 170 of the camera body 102 assigned as zoom manipulation buttons, the camera controller 153 detects start of zoom manipulation, based on the operation performed on the operation unit 170 by the user. Then, the camera controller 153 sends the lens controller 120 an instruction to drive the zoom lens 112. The drive instruction includes an instruction about moving direction and movement speed of the zoom lens 112 based on the operation state of the operation unit 170. The lens controller 120 receives the instruction to drive the zoom lens 112 and drives the zoom lens 112 through the zoom lens driver 113. As described above, the lens controller 120 periodically notifies the camera controller 153 of lens state data, according to a request from the camera controller 153. Therefore, the camera controller 153 can determine the position of the zoom lens 112.

When the zoom lever 115 of the interchangeable lens 101 is operated, the lens controller 120 detects start of zoom manipulation and notifies the camera controller 153 that zoom manipulation has started. In addition, the lens controller 120 controls the zoom lens driver 113 to drive the zoom lens 112, based on the operation state of the zoom lever 115. At this time, too, the lens controller 120 periodically sends the camera controller 153 lens state data, according to a request from the camera controller 153. Therefore, the camera controller 153 can periodically determine the position of the zoom lens 112.

Since the camera controller 153 is able to determine the position of the zoom lens 112, the camera controller 153 can perform a zoom control operation based on the zoom lens position. Namely, at any given time, the camera controller 153 can perform a zoom control operation based on the zoom lens position (optical zoom position) determined at such time.

In particular, the digital camera 100 of the present embodiment performs digital zoom when the zoom lens 112 is located at a predetermined optical zoom position where excellent resolution is provided. The camera controller 153 determines a predetermined optical zoom position where a digital zoom operation is to be performed (inserted), based on resolution characteristic information included in the lens data obtained from the interchangeable lens 101. In the present embodiment, the predetermined optical zoom position is a position P1 of the optical zoom where the resolution reaches its peak in a resolution characteristic such as that shown in FIG. 5B. That is, the camera controller 153 recognizes the position P1 of the optical zoom where the resolution reaches its peak, based on the resolution characteristic information.

During a period for which the zoom manipulation by the user continues, the zoom lens 112 moves in a direction according to an operation direction (the tele end side direction or the wide end side direction). If the zoom manipulation continues at the time when the zoom lens 112 reaches the predetermined optical zoom position P1 during the optical zoom operation, then the camera controller 153 stops the optical zoom and performs the digital zoom. Specifically, if the zoom manipulation continues when the zoom lens 112 gets to the predetermined optical zoom position P1, then the camera controller 153 temporarily stops the optical zoom operation and starts a digital zoom operation. Then, when the magnification of the digital zoom reaches a predetermined limit value, the camera controller 153 stops the digital zoom operation and resumes the optical zoom operation.

A zoom control operation including a control operation of the zoom lens 112 and a digital zoom control operation, which is performed based on the optical zoom position will be described below in turn. In the following description, it is assumed that zoom manipulation for instructing to perform a zoom operation froth the wide end side to the tele end side is made continuously by the user.

The camera controller 153 determines whether an optical zoom position is between the wide end and the position P1 (S302). If the optical zoom position is between the wide end and the position P1 (YES in step S302), then the processing proceeds to step S303. If the optical zoom position is not between the wide end and the position P1 (NO in step S302), then the processing proceeds to step S304. When the optical zoom position is between the wide end and the position P1, as shown in FIG. 5B, the resolution increases as the optical zoom position moves from the wide end to the position P1. In this case, the camera controller 153 does not perform a digital zoom operation but performs only an optical zoom operation until the zoom lens 112 reaches the position P1 where the resolution reaches it peak (S303).

If thereafter the optical zoom position moves as a result of continued zoom manipulation and thus it is no longer between the wide end and the position P1 (NO in step S302), then the camera controller 153 determines whether the optical zoom position reaches the position P1 (S304). If the optical zoom position is the position P1 (YES in step S304), then the processing proceeds to step S305. If the optical zoom position has passed the position P1 (NO in step S304), then the processing proceeds to step S306.

When the optical zoom position is the position P1, the resolution reaches its peak value, as shown in FIG. 5B. When the optical zoom position reaches the position P1 (YES in step S304), the camera controller 153 instructs the lens controller 120 to stop the movement of the zoom lens 112 even if the zoom manipulation by the user continues (S305) and further instructs the image processor 172 to start a digital zoom operation (S305). At this time, during a period during which the zoom manipulation by the user continues, the digital zoom is performed while changing the magnification of the digital zoom from 0.61× to 1.00×. As such, a digital zoom operation is performed within a zoom range where the image quality does not degrade by the digital zoom. When the digital zoom reaches 1.00×, the camera controller 153 stops the digital zoom operation and instructs the lens controller 120 to cancel the stop of the zoom lens 112 to resume the movement toward the tele end side. By such control, when the optical zoom position is at the position P1, a digital zoom operation can be performed in a state in which an image with high resolution is obtained.

Subsequently, the camera controller 153 determines whether the optical zoom position is between the position P1 and the tele end (S306). If the optical zoom position is between the position P1 and the tele end (YES in step S306), then the processing proceeds to step S307. If the optical zoom position is not between the position P1 and the tele end (NO in step S306), i.e., if the optical zoom position has reached the tele end, then the processing proceeds to step S308. When the optical zoom position is between the position P1 and the tele end, as shown in FIG. 5B, the resolution decreases as the optical zoom position moves from the position P1 to the tele end. Thus, at this time, the camera controller 153 does not perform a digital zoom operation but performs only an optical zoom operation (S307).

When the optical zoom position has reached the tele end as a result of continued zoom manipulation, further optical zoom to the tele end side cannot be performed. Hence, when the optical zoom position has reached the tele end (NO in step S306), then the camera controller 153 stops the optical zoom and instructs the image processor 172 to perform a digital zoom operation (S308). At this time, the magnification of the digital zoom has already reached 1.00×. Hence, the digital zoom is performed from 1.00× to 2.00×. When digital zoom is performed at such magnification, although degradation occurs in image quality, an image with high magnification can be obtained by a combination of the optical zoom and the digital zoom.

The camera controller 153 monitors whether the zoom manipulation has been cancelled (S309). Thus, until the zoom manipulation by the user is cancelled, the camera controller 153 repeats the operations in steps S301 to S308 (S309). If the zoom manipulation by the user has been cancelled, then the optical zoom position and the digital zoom position are maintained in their positions obtained at the time of the cancellation of the zoom manipulation, and the camera controller 153 terminates the zoom operation control in such a state.

As described above, the digital camera 100 of the present embodiment performs the digital zoom at the optical zoom position P1 where the resolution reaches its peak, as shown in FIGS. 5A and 5B. An advantageous effect brought about by thus performing the digital zoom at an optical zoom position where an excellent resolution characteristic is obtained will be described with reference to FIG. 6. In FIG. 6, the horizontal axis represents the total zoom magnification of the optical zoom and the digital zoom and the vertical axis represents the resolution of the optical system of the interchangeable lens 101.

In FIG. 6, a dashed line indicates a change in resolution caused by a zoom operation in conventional art. In the zoom operation in the conventional art, when a zoom operation is performed from the wide end to the tele end, the optical zoom is first performed. That is, the optical zoom is performed until reaching a zoom position where the optical zoom reaches its limit magnification (zone T11). At this time, as indicated by the dashed line in FIG. 6, the resolution changes with the movement of the zoom lens 112. Specifically, the resolution decreases when exceeding the peak position P1 of the resolution. Thereafter, when reaching the limit of the optical zoom, the optical zoom stops and thereafter digital zoom is driven (zone T12).

In FIG. 6, a solid line indicates a change in resolution caused by a zoom operation in the present embodiment. According to the zoom operation in the present embodiment, optical zoom is performed until the zoom position reaches the peak position P1 of the resolution from the wide end (zone T1). When the optical zoom position reaches the peak position P1, the optical zoom is stopped and digital zoom is performed within a range in which degradation in image quality does not occur (zone T2). At this time, the zoom lens 112 is maintained at the position P1, and thus the resolution of the optical system is maintained at the peak value. That is, during this period, the zoom magnification can be increased with high resolution maintained. Thereafter, when the digital zoom reaches the limit of the range in which degradation in image quality does not occur, the digital zoom is stopped and the optical zoom is driven (zone T3). At this time, the resolution decreases with the movement of the zoom lens 112 (see FIG. 5B). Thereafter, when reaching the limit of the optical zoom, the digital zoom is driven again (zone T4).

As described above, according to the present embodiment, a zoom operation can be performed with high resolution of the optical system maintained in the zones T2 and T3 (a single-hatched region in FIG. 6), as indicated by the solid line in FIG. 6. Namely, in the zones T2 and T3, zoom shooting can be performed in a better resolution range than that for the conventional art.

Second Embodiment

Another embodiment of a digital camera will be described. The configuration and imaging preparation operation of a digital camera according to the present embodiment are the same as those for the case of the first embodiment and thus description thereof is omitted. The digital camera according to the second embodiment differs from the digital camera according to the first embodiment in zoom control operation.

Figure 7:
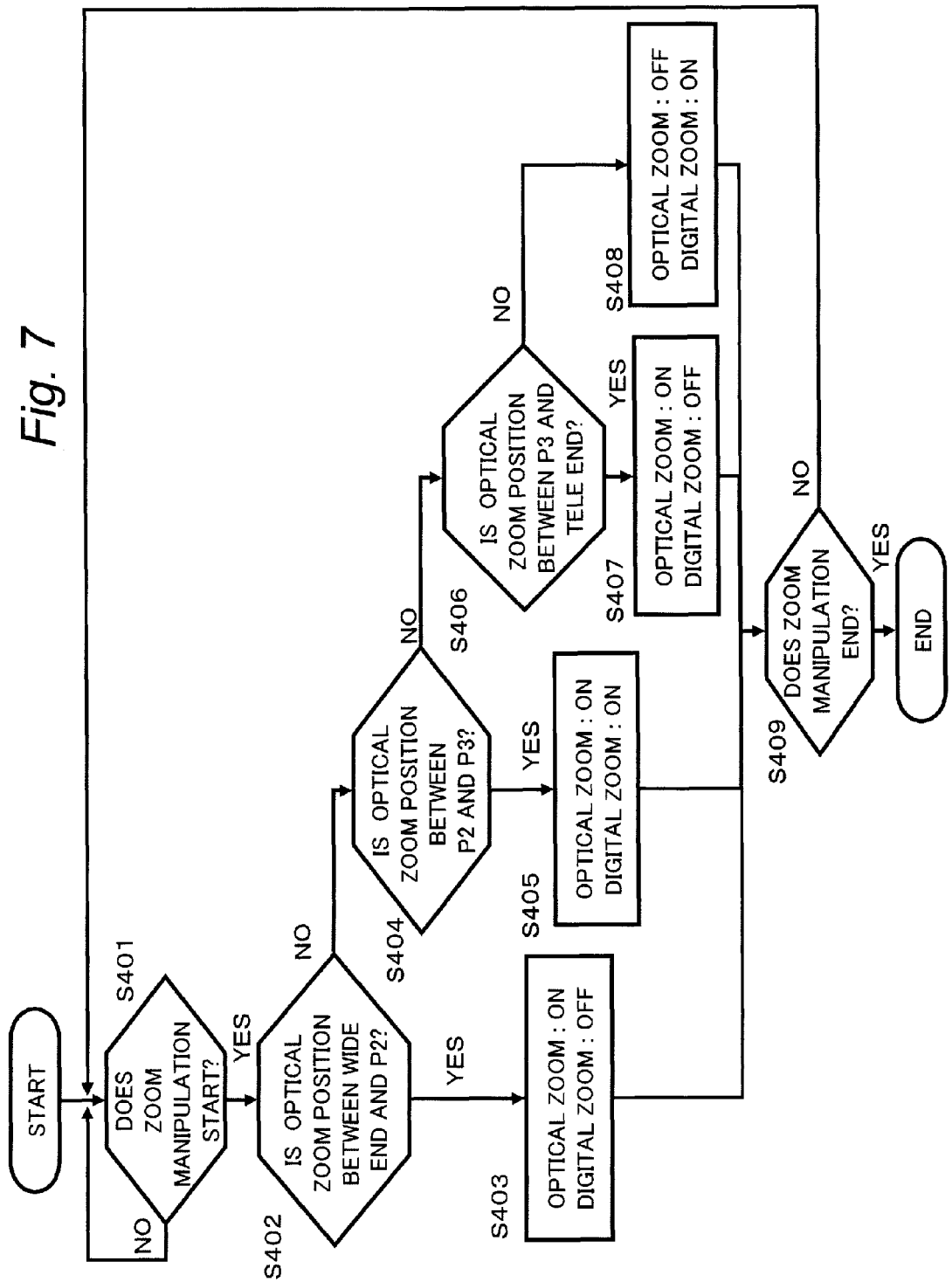
FIG. 7 is a flowchart of a zoom control operation according to a second embodiment.
Figure 8A:
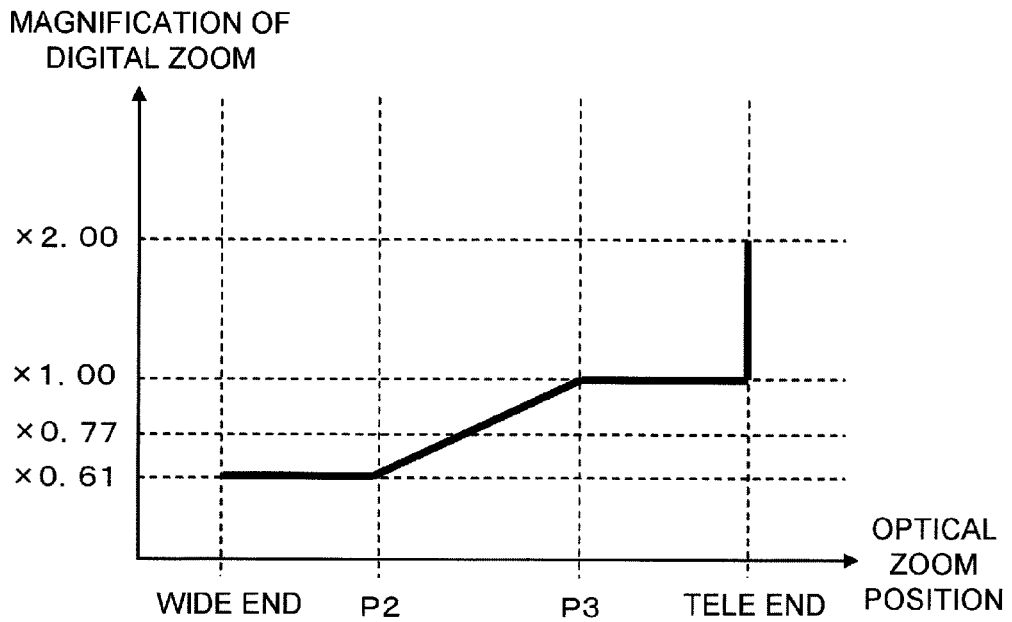
FIGS. 8A and 8B are diagrams for describing the zoom control operation according to the second embodiment.
Figure 8B:
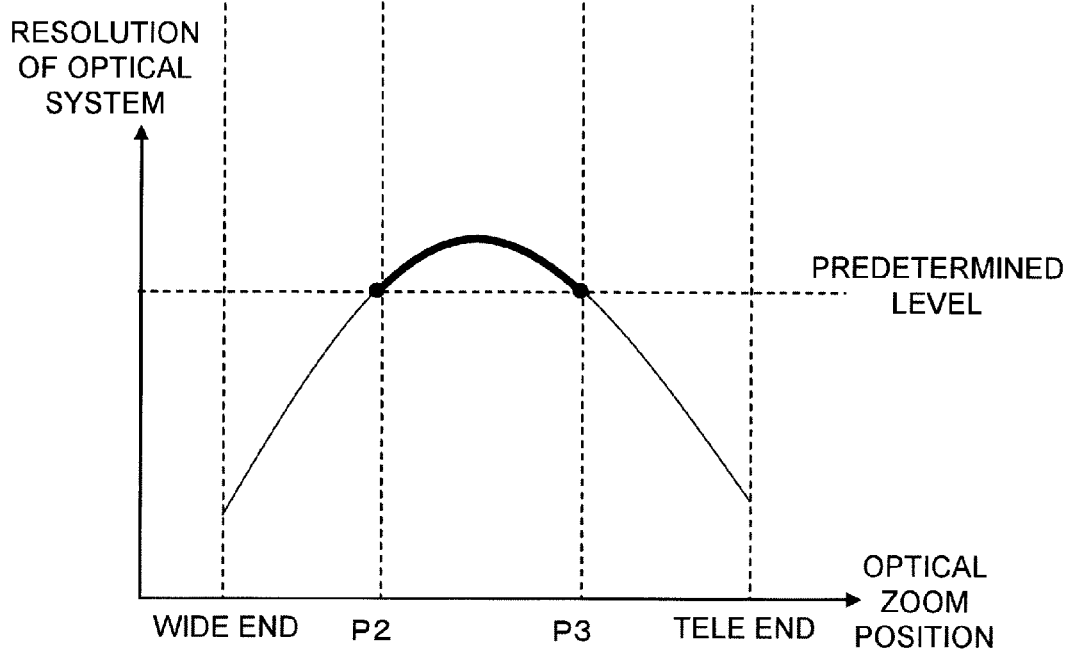

Using FIGS. 7, 8A, and 8B, a zoom control operation of the digital camera according to the second embodiment will be described. FIG. 7 is a flowchart of a zoom control operation of the digital camera according to the second embodiment. FIG. 8A is a diagram showing the digital zoom magnification for the optical zoom position in the zoom control operation according to the second embodiment. FIG. 8B is a diagram showing an example of the resolution characteristic of an optical system of an interchangeable lens 101 according to the second embodiment.

The resolution characteristic of the optical system of the interchangeable lens 101 in the second embodiment which is shown in FIG. 8B is the same as that shown in FIG. 5B which is shown in the first embodiment. In a zoom control operation according to the first embodiment, the zoom control operation is switched according to whether the optical zoom reaches a position P1 at which the peak of resolution is given. On the other hand, in a zoom control operation according to the second embodiment, as shown in FIG. 8B, the zoom control is switched according to whether the optical zoom position is located at a position (between positions P2 and P3) at which the resolution is at a predetermined level or higher. Here, the predetermined level is, for example, a resolution level at which a contrast value is 50% or more. A camera controller 153 of the present embodiment determines optical zoom positions where the resolution is at the predetermined level or higher (a range of from the position P2 to the position P3), based on the resolution characteristic information included in the lens data which is obtained from the interchangeable lens 101.

With reference to the flowchart shown in FIG. 7, a zoom control operation performed when the interchangeable lens (motor-driven zoom lens) 101 having the resolution characteristic information such as that shown in FIG. 8B is attached to the camera body 102 will be described.

First, the camera controller 153 monitors whether the zoom manipulation has started by the user (S401). The camera controller 153 repeats this step until detecting start of the zoom manipulation by the user (NO in step S401). The zoom manipulation by the user includes a manipulation (operation) performed using the operation unit 170 included in the camera body 102 and a manipulation (operation) performed using the zoom lever 115 included in the interchangeable lens 101. In either case, the manipulation is the same as that described in the first embodiment and thus description thereof is omitted here.

During a period for which the zoom manipulation by the user continues, the zoom lens 112 moves in a direction according to a zoom manipulation direction (the tele end side direction or the wide end side direction). In the present embodiment, if the zoom manipulation continues when the zoom lens 112 gets to an optical zoom position (the range of between the positions P2 and P3 in FIG. 8B) where the resolution is at the predetermined level or higher, then the camera controller 153 inserts a digital zoom control operation.

When the zoom manipulation starts, the zoom control operation including a control operation of the zoom lens 112 and the digital zoom control operation is performed (S402 to S409). The operation will be described below sequentially. In the following description, it is assumed that zoom manipulation instructing to perform a zoom operation from the wide end side to the tele end side is continuously performed.

The camera controller 153 determines whether an optical zoom position is between the wide end and the position P2 (S402). If the optical zoom position is between the wide end and the position P2 (YES in step S402), then the processing proceeds to step S403. If the optical zoom position is not between the wide end and the position P2 (NO in step S402), then the processing proceeds to step S404. When the optical zoom position is between the wide end and the position P2, as shown in FIG. 8B, the resolution increases as the optical zoom position moves from the wide end to the position P2. At this time, the camera controller 153 does not perform the digital zoom operation but performs only the optical zoom operation until the zoom lens 112 reaches the position P2 where the resolution is at the predetermined level or higher (S403).

When thereafter the optical zoom position moves as a result of continued zoom manipulation and thus is no longer between the wide end and the position P2 (NO in step S402), then the camera controller 153 determines whether the optical zoom position is located between the position P2 and the position P3, inclusive (S404). If the optical zoom position is located between the position P2 and the position P3, inclusive (YES in step S404), then the processing proceeds to step S405. If the optical zoom position is not located between the position P2 and the position P3, inclusive (NO in step S404), then the processing proceeds to step S406. When the optical zoom position is located between the position P2 and the position P3, inclusive, as shown in FIG. 8B, the resolution is at the predetermined level or higher. When the optical zoom position is located between the position P2 and the position P3, inclusive (YES at S404), if the zoom manipulation by the user continues, then the camera controller 153 instructs the image processor 172 to start a digital zoom operation in accordance with the movement of the zoom lens 112 from the wide end side to the tele end side (optical zoom) (S405). At this time, during a period for which the zoom manipulation by the user continues, the magnification of the digital zoom is changed from 0.61× to 1.00×. Namely, a digital zoom operation is performed within a range where the image quality does not degrade by the digital zoom. At this time, the camera controller 153 instructs the image processor 172 to perform digital zoom from 0.61× to 1.00× at a speed according to a zoom speed of the zoom lens 112 which is instructed by the manipulation performed by the user on the operation unit 170 or the zoom lever 115. By this, the optical zoom and the digital zoom can be driven in combination, with the resolution being at the predetermined level or higher, so that an image with high magnification can be obtained with high resolution guaranteed. When the digital zoom reaches 1.00×, the camera controller 153 stops the digital zoom operation and instructs the lens controller 120 to continue the movement of the zoom lens 112 to the tele end side.

Subsequently, the camera controller 153 determines whether the optical zoom position is between the position P3 and the tele end (S406). If the optical zoom position is between the position P3 and the tele end (YES in step S406), then the processing proceeds to step S407. If the optical zoom position is not between the position P3 and the tele end (NO in step S406), i.e., if the optical zoom position reaches the tele end, then the processing proceeds to step S408.

When the optical zoom position is between the position P3 and the tele end, as shown in FIG. 8B, the resolution decreases as the optical zoom position moves from the position P3 to the tele end. If the optical zoom position is between the position P3 and the tele end (YES in step S406), then a digital zoom operation is not performed but only an optical zoom operation is performed (S407).

When the zoom lens 112 reaches the tele end as a result of further continued zoom manipulation, further optical zoom to the tele end side cannot be performed. Hence, if the zoom lens 112 reaches the tele end (NO in step S406), then the camera controller 153 instructs the image processor 172 to perform a digital zoom operation (S408). At this time, the magnification of the digital zoom has already reached 1.00×. Hence, the digital zoom is performed from 1.00× to 2.00×. Although the digital zoom magnification range at this time is a range where degradation occurs in image quality, an image with high magnification can be obtained by a combination of the optical zoom and the digital zoom.

The camera controller 153 monitors whether the zoom manipulation has been cancelled (S409). Until the zoom manipulation by the user is cancelled, the camera controller 153 repeats the operations in steps S401 to S408. If the zoom manipulation by the user has been cancelled, then the optical zoom position and the digital zoom position are maintained in their positions obtained at the time of the cancellation of the zoom manipulation, and the camera controller 153 terminates the zoom operation control in such a state.

Figure 9:
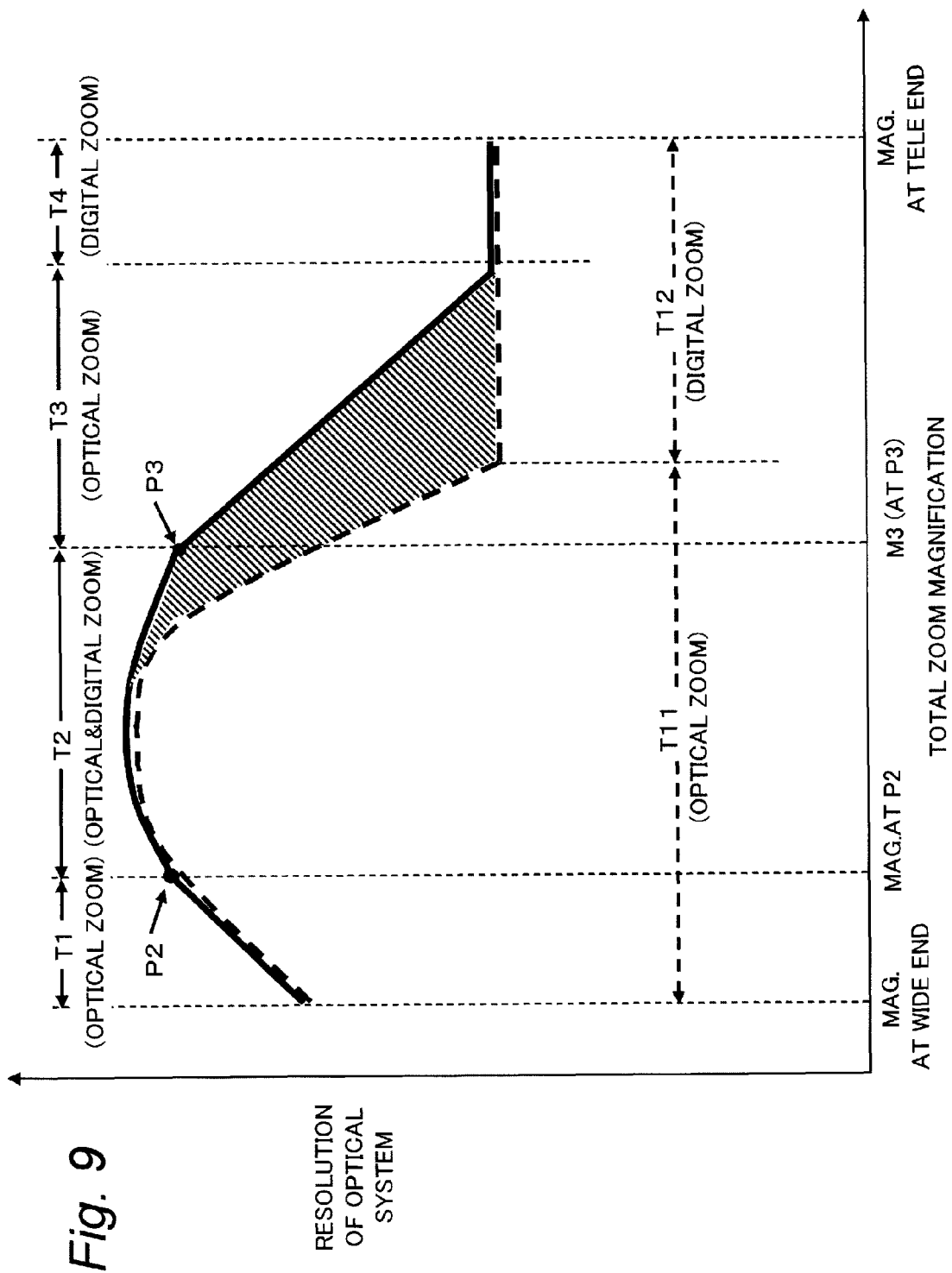
FIG. 9 is a diagram for describing a technical effect obtained by the zoom control operation according to the second embodiment.

As described above, a digital camera 100 of the second embodiment performs the digital zoom in the optical zoom positions P2 to P3 where the resolution exceeds the predetermined level, as shown in FIGS. 8A and 8B. FIG. 9 is a diagram showing changes in resolution caused by zoom operations in the second embodiment and in a conventional art. In FIG. 9, a dashed line indicates a change in resolution caused by a zoom operation in the conventional art, and a solid line indicates a change in resolution caused by a zoom operation in the second embodiment.

In the second embodiment, when the optical zoom position is located between the zoom positions P2 and P3 where the resolution exceeds the predetermined level, the digital zoom is performed together with the optical zoom (zone T2). At this time, in the second embodiment, since the optical zoom and the digital zoom are driven in combination, the magnification of the optical zoom itself for achieving total zoom magnification M3 (magnification in the position P3) is smaller than that for the conventional art. Thus, the amount of movement of the zoom lens 112 for achieving the zoom magnification M3 in the second embodiment is smaller than that for the conventional art. Accordingly, the amount of reduction in resolution is also smaller than that for the conventional art. In the zone T3, too, the combined magnification of the magnification of the optical zoom and the magnification of the digital zoom is obtained and the magnification of the digital zoom is magnification that does not cause image quality degradation. Thus, the magnification of the optical zoom itself is suppressed over the conventional art. By this, the amount of movement of the zoom lens 112 is also smaller than that for the conventional art and thus a reduction in resolution caused by a change in optical zoom position can also be reduced.

As described above, in the present embodiment, too, a zoom operation can be performed with high resolution of the optical system maintained in the zones T2 and T3 (a single-hatched region in FIG. 9), as indicated by the solid line in FIG. 9. Namely, in the zones T2 and T3, zoom shooting can be performed in a better resolution range than that for the conventional art.

CONCLUSION

A digital camera 100 described in the above-described embodiments includes an optical system including a zoom lens 112, a zoom lens driver 113 that performs optical zoom by driving the zoom lens 112 according to a user operation (manipulation), a camera controller 153 that obtains lens data including resolution characteristic information indicating resolutions of the optical system for positions of the zoom lens 112, a CMOS image sensor 150 that captures a subject image formed through the optical system to output image information, an image processor 172 that performs digital zoom to electronically enlarge the subject image by performing image processing on the image information outputted from the CMOS image sensor 150, and the controller 153 that determines, based on the obtained lens data, whether the zoom lens 112 is located in a predetermined position (P1 or between P2 and P3) and controls the image processor 172 to perform the digital zoom on the image information outputted from the CMOS image sensor 150, when the zoom lens 112 is located in the predetermined position. The predetermined position is a position of the zoom lens 112 at which resolution of the optical system is larger than a predetermined value.

By this configuration, when the zoom lens 112 is located in a position at which the resolution of the optical system is higher than the predetermined value, the digital camera 100 can control the zoom operation to perform the digital zoom. By this, when the optical zoom and the digital zoom are performed, an image with better resolution can be obtained.

The camera controller 153 controls, based on the obtained lens data, the image processor 172 to perform digital zoom on the image information outputted from the CMOS image sensor 150, when the zoom lens 112 is located in a position P1 where maximum resolution is given. By this, the digital camera 100 can perform digital zoom on image information which is obtained with the resolution being highest, and can further improve the resolution of an image obtained as a result of the zoom. In addition, at this time, the zoom lens driver 113 stops the drive of the zoom lens 112 while the image processor 172 is performing the digital zoom. This enables the digital camera 100 to perform the digital zoom on the obtained image information, with the highest resolution state maintained.

The digital camera 100 further includes a configuration (the camera controller 153 and a card slot 165) for controlling to record the image information in a memory card 164. In the digital zoom with the zoom lens 112 being in the predetermined position, the image processor 172 performs a cutout process such that the number of pixels composing the cut out image information is greater than the number of pixels composing the image information recorded in the memory card 164. This enables the digital camera 100 to perform the digital zoom in a zoom lens position where high resolution is obtained and in a zoom magnification range where image information does not degrade. Hence, magnification obtained by combining the optical zoom and the digital zoom can be increased as much as possible, with the excellent resolution maintained.

Other Embodiments

Embodiments are not limited to the above-described embodiments and other embodiments can also be considered. The other embodiments will be summarized below.

Figure 10A:
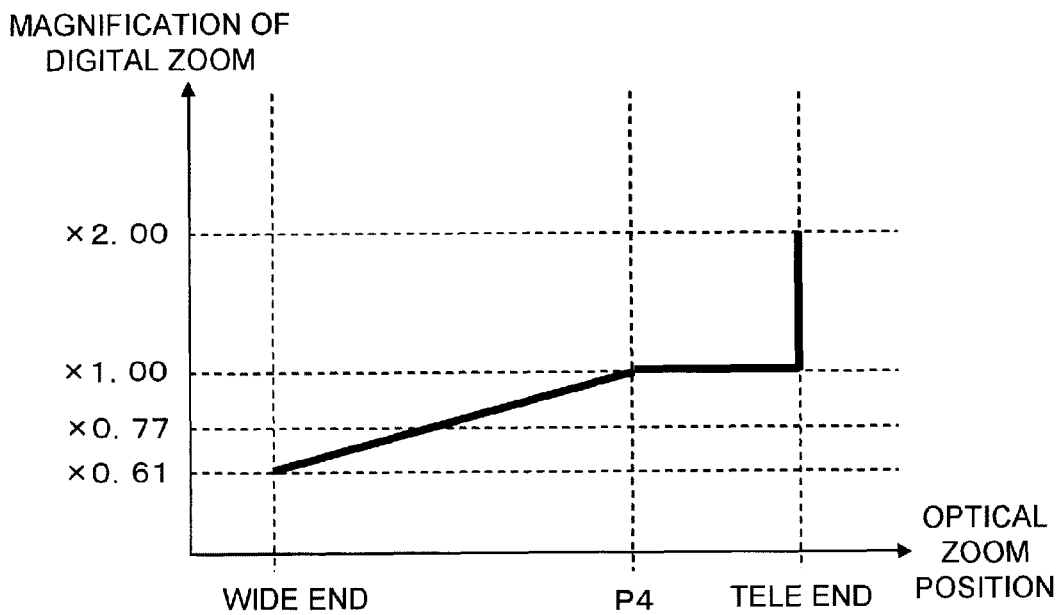
FIGS. 10A and 10B are diagrams for describing a zoom control operation (first example) according to another embodiment.
Figure 10B:
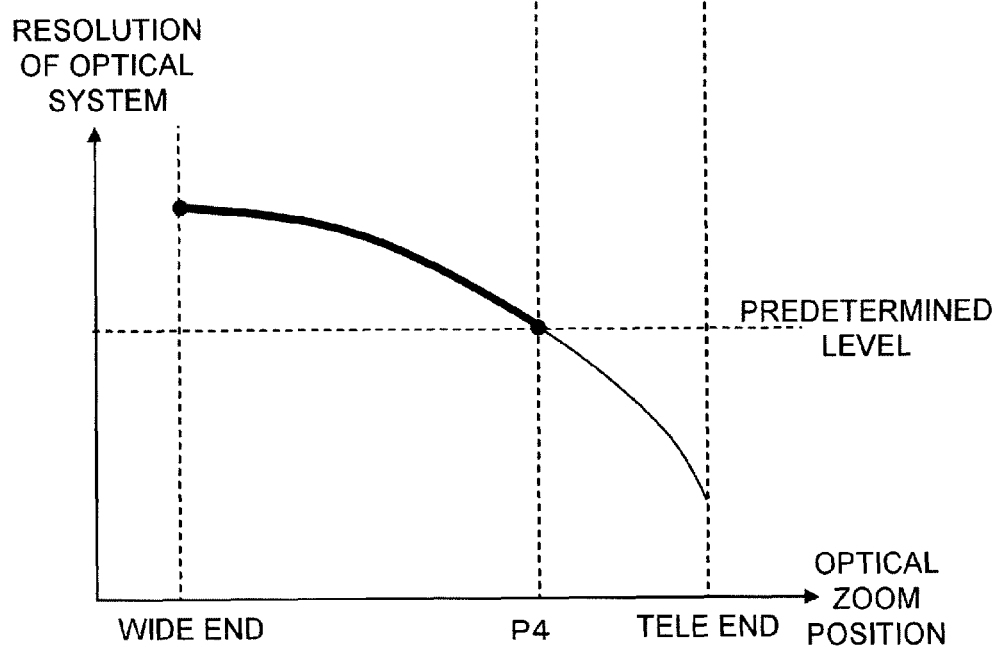

Although the above-described embodiments describe resolution characteristic information having a resolution peak position such as that shown in FIGS. 5B and 8B, the profile of the resolution characteristic is not limited thereto. Specifically, the idea of the embodiment can also be applied to an optical system which is optically designed such that, as shown in FIG. 10B, the resolution monotonously decreases as moving from the wide end side to the tele end side. In this case, as in the case of the second embodiment, as shown in FIG. 10A, the camera controller 153 performs the digital zoom when the optical zoom position is at an optical zoom position (between the wide end and a position P4) where the resolution is at a predetermined level or higher. In this case, too, it is desirable that a digital zoom operation be performed in a magnification range where the image quality does not degrade. Note that, though not shown, even if optical design is such that the value represented by a resolution characteristic monotonously increases as moving from the wide end side to the tele end side, the idea of the embodiment can be applied in the same manner.

Figure 11:
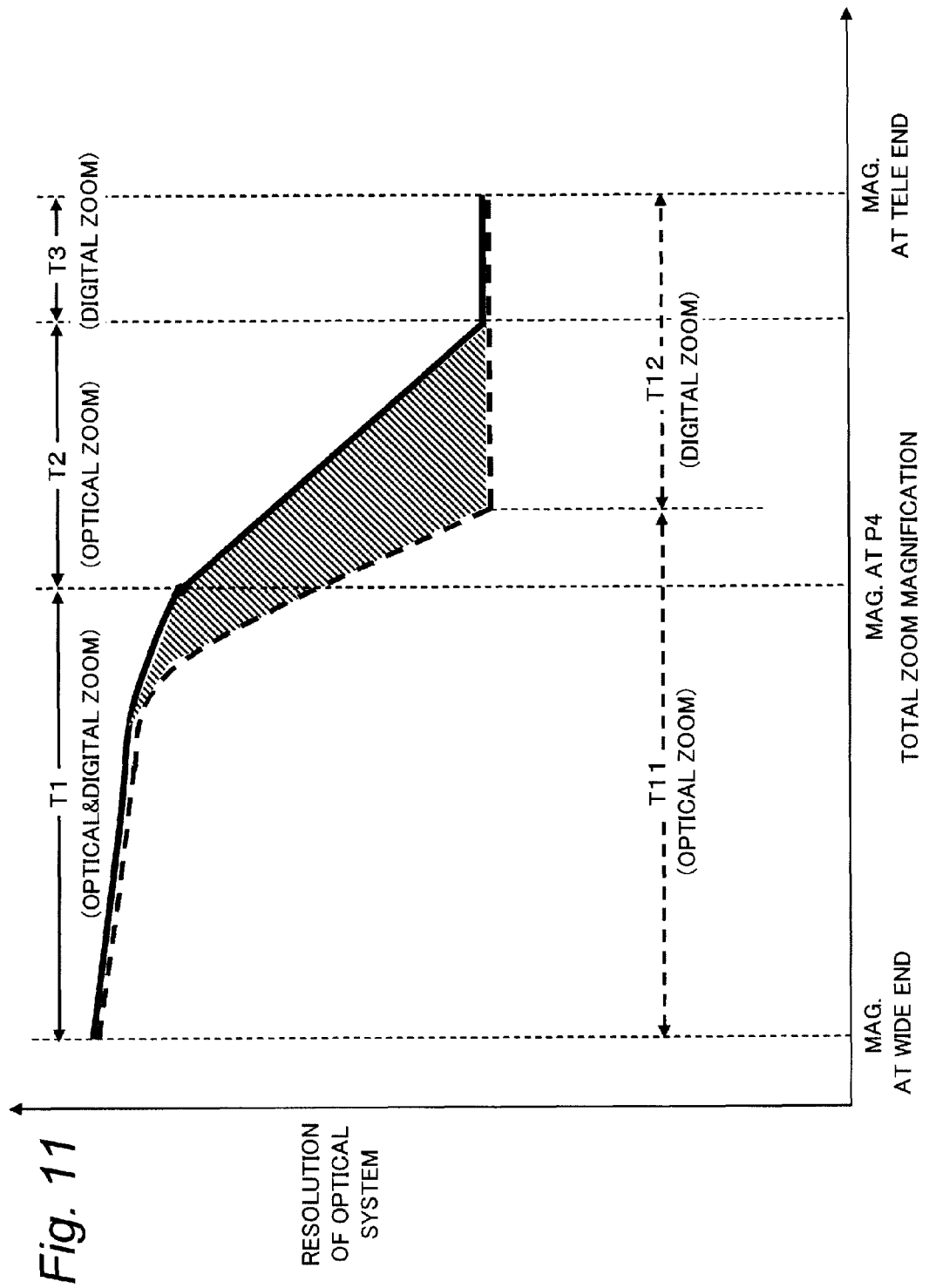
FIG. 11 is a diagram for describing a technical effect obtained by the zoom control operation according to another embodiment.
Figure 12A:
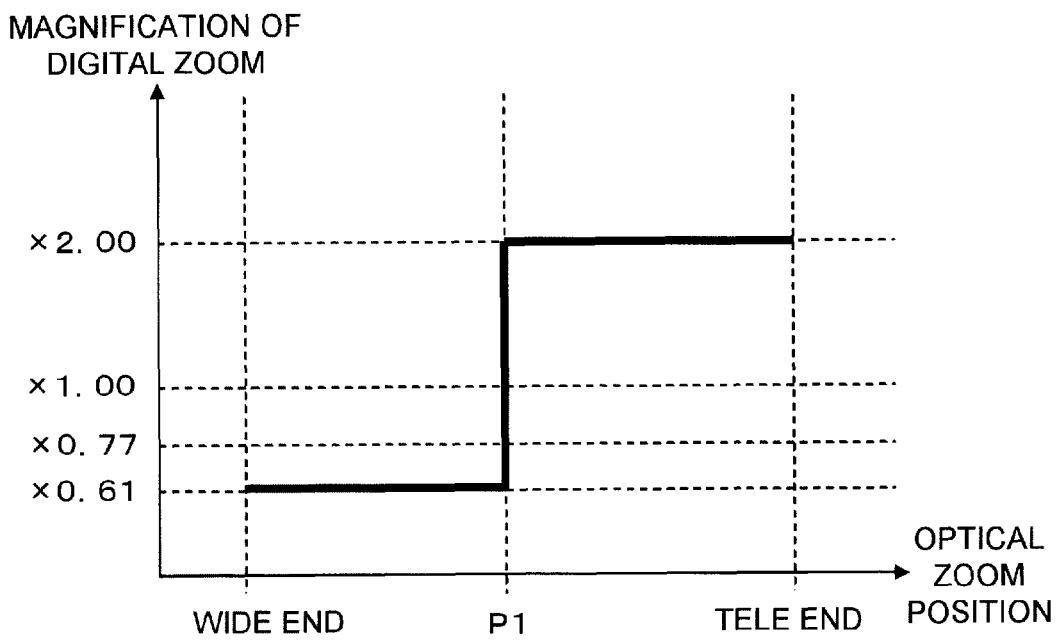
FIGS. 12A and 12B are diagrams for describing a zoom control operation (second example) according to another embodiment.
Figure 12B:
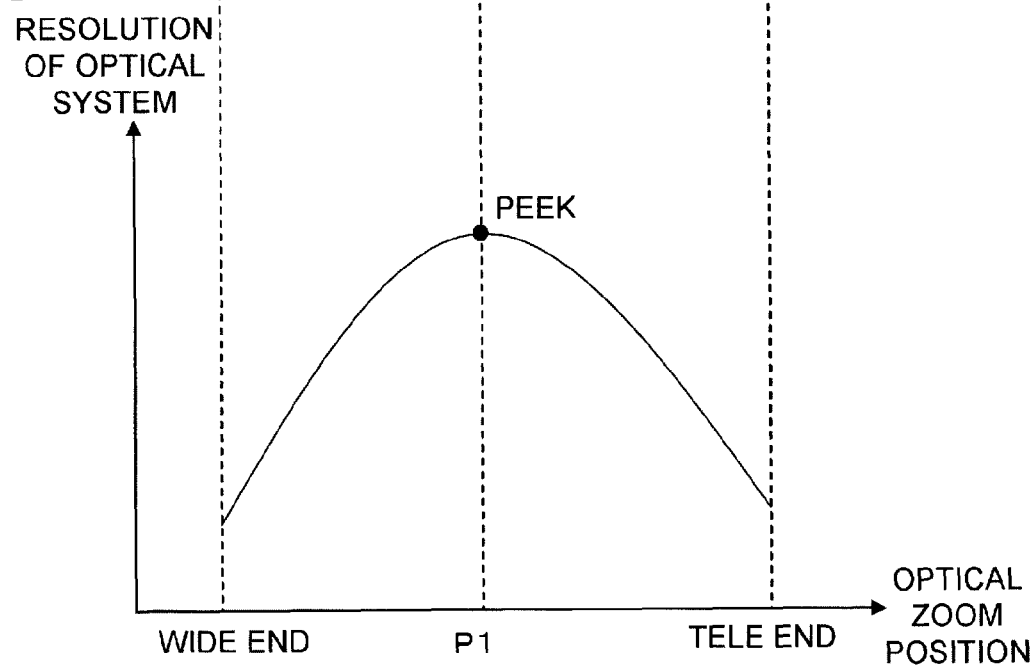
Figure 13A:
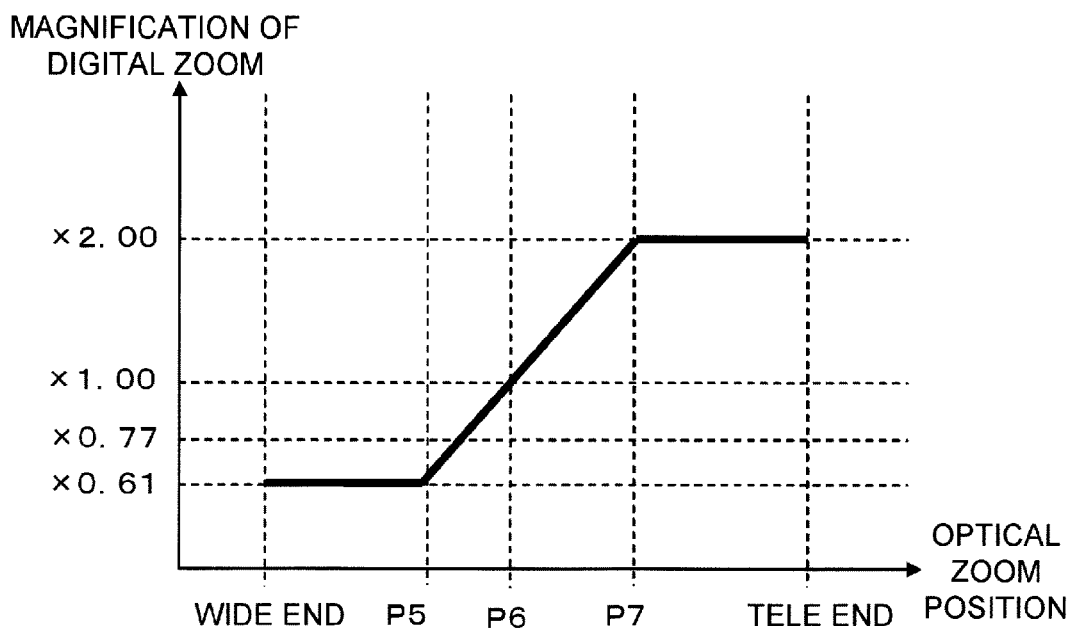
FIGS. 13A and 13B are diagrams for describing a zoom control operation (third example) according to another embodiment.
Figure 13B:
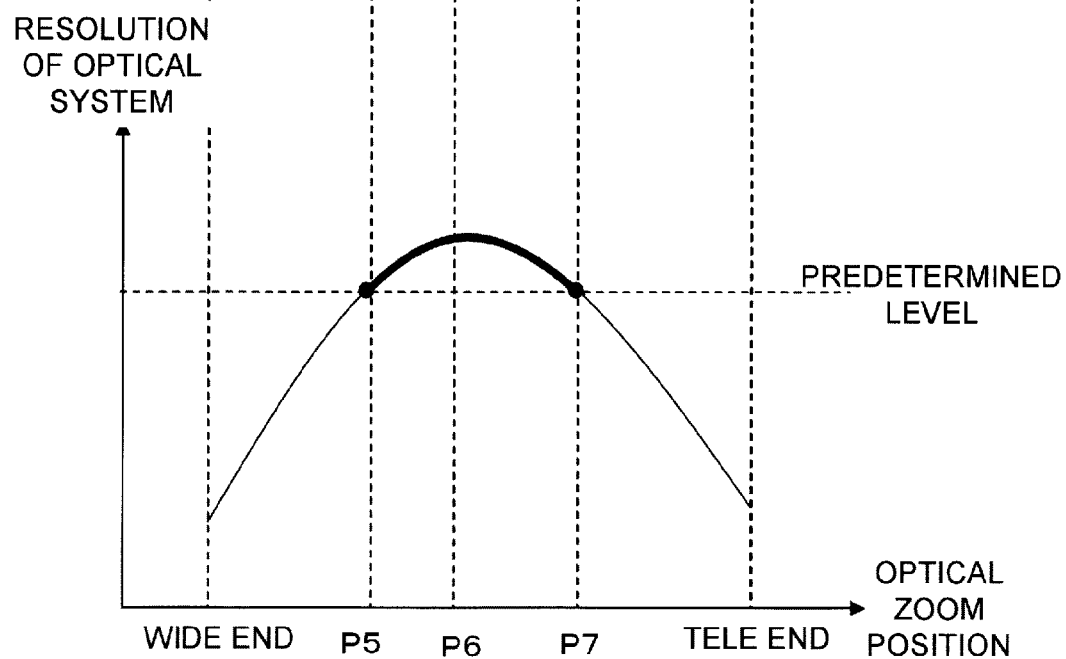

FIG. 11 shows changes in the resolution of the optical system caused by zoom operations in the present example shown in FIGS. 10A and 10B and in conventional art. In FIG. 11, a dashed line indicates a change in resolution caused by a zoom operation in the conventional art, and a solid line indicates a change in resolution caused by a zoom operation in the present example shown in FIGS. 10A, and 10B. In the present example, optical zoom and digital zoom are driven in optical zoom positions (between the wide end and the position P4) where the resolution is at the predetermined level or higher (zone T1). Then, in the optical zoom position P4, when the digital zoom reaches the limit of zoom magnification where image quality degradation does not occur, the digital zoom is stopped (zone T2). In the present example, too, a zoom operation can be performed with high resolution of the optical system maintained in the zones T1 and T2, as indicated by the solid line in FIG. 11. Namely, in the zones T1 and T2, zoom shooting can be performed in a better resolution range than that for the conventional art.

The above-described embodiments describe that the digital zoom operation performed when the optical zoom reaches the predetermined position P1 or between P2 and P3 is performed within a digital zoom magnification range where an image does not degrade. However, as shown in FIGS. 12A, 12B, 13A, and 13B, the digital zoom may be performed at the highest possible magnification at an optical zoom position P1 where the peak of resolution is given, or at the optical zoom position (between P5 and P7) where the resolution is at a predetermined level or higher. In this case, when the digital zoom is performed in a zoom range of from 1.00× to 2.00× where normally the image quality degrades, it is desirable to perform the digital zoom in parallel with image processing such as an ultra-resolution process which compensates for image quality degradation.

Although, in the above-described embodiments, a camera system including an interchangeable lens 101 and a camera body 102 that allows the interchangeable lens 101 to be attached thereto is described as an example, the idea of the embodiment is not limited thereto. Specifically, the idea of the embodiment can also be applied to a digital camera having a lens integrated with a camera body. In this case, too, a zoom control operation in which optical zoom and digital zoom are combined is performed according to the resolution characteristic of the built-in lens.

Although, in the above-described embodiments, the camera controller 153 determines the zoom control operation based on resolution characteristic information and an optical zoom position which are notified from the lens controller 120, the embodiment is not limited thereto. Specifically, the lens controller 120 may control the operation of the zoom lens 112 or instruct the camera controller 153 to allow the image processor 172 to perform a digital zoom operation, based on resolution characteristic information owned thereby and an optical zoom position which is directly obtained thereby.

In the above-described embodiments, in order to control the timing at which a digital zoom operation is performed, the camera controller 153 determines a predetermined optical zoom position(s) (P1 or between P2 and P3) where digital zoom is to be inserted based on the resolution characteristic information obtained from the interchangeable lens 101 and compares the current position of the zoom lens 112 obtained from the interchangeable lens 101 with the predetermined optical zoom position(s). Instead of such control, in order to control the timing at which a digital zoom operation is performed, the camera controller 153 may determine a resolution associated with the current position of the zoom lens 112 obtained from the interchangeable lens 101 by referring to the resolution characteristic information, and determine whether the resolution is at its peak value or whether the resolution is at a predetermined level or higher.

In the above-described embodiments, the digital zoom operation control is performed using information about the optical resolution of an image captured by the CMOS image sensor 150. In the digital zoom operation control, optical characteristics (e.g., aberration, etc.) other than resolution that change based on the position of the zoom lens 112 may be used.

INDUSTRIAL APPLICABILITY

The embodiment can be applied to an imaging apparatus having an optical zoom control function and a digital zoom control function, such as a digital camera, a movie camera, and a mobile phone with a camera.

What is claimed is:

1. An imaging apparatus, comprising:
    an optical system including a zoom lens;
    a zoom lens driver that performs optical zoom by driving the zoom lens according to a user's manipulation;
    an obtaining unit that obtains lens information including information indicating resolutions of the optical system for respective positions of the zoom lens;
    an imaging sensor that captures a subject image formed through the optical system to output image information;
    an image processor that performs digital zoom to electronically enlarge the subject image by performing image processing on the image information outputted from the imaging sensor; and
    a controller that determines, based on the obtained lens information, whether the zoom lens is located in a predetermined position and controls the image processor to perform the digital zoom on the image information outputted from the imaging sensor when the zoom lens is determined to be located in the predetermined position, wherein
    the predetermined position is a position of the zoom lens where a resolution of the optical system is larger than a predetermined value.

2. The imaging apparatus according to claim 1, wherein the predetermined position is a position of the zoom lens where the resolution of the optical system is a maximum resolution.

3. The imaging apparatus according to claim 2, wherein the zoom lens driver stops the drive of the zoom lens while the image processor is performing the digital zoom with the zoom lens being in the predetermined position.

4. The imaging apparatus according to claim 1, wherein the zoom lens driver drives the zoom lens while the image processor is performing the digital zoom with the zoom lens being in the predetermined position.

5. The imaging apparatus according to claim 1, further comprising:
    a recording controller that controls recording of the image information in a recording medium, wherein
    the image processor performs the digital zoom by performing a cutout process for cutting out partial image information from the image information outputted from the imaging sensor, and performs a process for converting a number of pixels on the cut out image information, and
    when the digital zoom is performed with the zoom lens being in the predetermined position, the cutout process is performed such that the number of pixels composing the cut out image information is greater than a number of pixels composing the image information recorded in the recording medium.

6. A camera body to which an interchangeable lens having an optical system including a zoom lens is mountable, the camera body comprising:
- an obtaining unit that obtains, from the interchangeable lens, lens information including information indicating a resolution of the optical system with respect to a position of the zoom lens;
- an imaging sensor that captures a subject image formed through the optical system to output image information;
- an image processor that performs digital zoom to electronically enlarge the subject image by performing image processing on the image information outputted from the imaging sensor; and
- a controller that determines, based on the obtained lens information, whether the zoom lens is located in a predetermined position and controls the image processor to perform the digital zoom on the image information outputted from the imaging sensor when the zoom lens is determined to be located in the predetermined position, wherein
- the predetermined position is a position of the zoom lens where a resolution of the optical system is larger than a predetermined value.

7. The camera body according to claim 6, wherein the predetermined position is a position of the zoom lens where the resolution of the optical system is a maximum resolution.

8. The camera body according to claim 7, wherein the zoom lens driver stops the drive of the zoom lens while the image processor is performing the digital zoom with the zoom lens being in the predetermined position.

9. The camera body according to claim 6, wherein the zoom lens driver drives the zoom lens while the image processor is performing the digital zoom with the zoom lens being in the predetermined position.

10. The camera body according to claim 6, further comprising:
- a recording controller that controls recording of the image information in a recording medium, wherein
- the image processor performs the digital zoom by performing a cutout process for cutting out partial image information from the image information outputted from the imaging sensor, and performs a process for converting a number of pixels on the cut out image information, and
- when digital zoom is performed with the zoom lens being in the predetermined position, the cutout process is performed such that the number of pixels composing the cut out image information is greater than a number of pixels composing the image information recorded in the recording medium.

11. The imaging apparatus according to claim 1, wherein the imaging apparatus includes an interchangeable lens and a camera body that enables the interchangeable lens to be attached thereto.

12. The imaging apparatus according to claim 11, further comprising an operation unit provided on the camera body and a zoom lever provided on the interchangeable lens, wherein zoom manipulation by the user includes either a manipulation performed using the operation unit provided on the camera body or a manipulation performed using the zoom lever provided on the interchangeable lens.

13. The imaging apparatus according to claim 1, wherein the imaging apparatus is a digital camera having a lens integrated with a camera body.

* * * * *